US010277646B2

(12) United States Patent
Jha et al.

(10) Patent No.: US 10,277,646 B2
(45) Date of Patent: Apr. 30, 2019

(54) GENERATING AN AUTOMATED MULTIMEDIA FEED BASED ON VIRTUAL IT INFRASTRUCTURE USERS NEEDS/INTEREST

(71) Applicant: VMWARE, INC., Palo Alto, CA (US)

(72) Inventors: Prafull Kumar Jha, Bangalore (IN); Manoj Krishnan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 532 days.

(21) Appl. No.: 14/662,256

(22) Filed: Mar. 19, 2015

(65) Prior Publication Data

US 2016/0182583 A1 Jun. 23, 2016

(30) Foreign Application Priority Data

Dec. 19, 2014 (IN) .......................... 6429/CHE/2014

(51) Int. Cl.
| | |
|---|---|
| G10L 13/00 | (2006.01) |
| H04L 29/06 | (2006.01) |
| H04L 29/08 | (2006.01) |
| H04L 29/14 | (2006.01) |
| H04N 21/81 | (2011.01) |
| H04N 21/2343 | (2011.01) |

(52) U.S. Cl.
CPC ...... *H04L 65/4069* (2013.01); *H04L 65/4084* (2013.01); *H04L 65/602* (2013.01); *H04L 67/10* (2013.01); *H04L 69/40* (2013.01); *H04N 21/234336* (2013.01); *H04N 21/816* (2013.01); *G10L 13/00* (2013.01)

(58) Field of Classification Search
USPC ........................................................ 709/219
See application file for complete search history.

(56) References Cited

U.S. PATENT DOCUMENTS

| | | | | |
|---|---|---|---|---|
| 2003/0229900 | A1* | 12/2003 | Reisman | .......... G06F 17/30873 |
| | | | | 725/87 |
| 2006/0167860 | A1 | 7/2006 | Eliashberg et al. | |

(Continued)

OTHER PUBLICATIONS

Jobst Loffler, German National Research Center for Information Technology, "Content-based Retrieval of 3D Models in Distributed Web Databases by Visual Shape Information", 2000 IEEE.*

(Continued)

*Primary Examiner* — Umar Cheema
*Assistant Examiner* — John Fan

(57) ABSTRACT

Techniques for generating multimedia feed based on virtual IT infrastructure user's needs in a virtual datacenter are described. In one example embodiment, a request to dynamically render multimedia feed associated with the virtual datacenter is received via a virtual IT infrastructure user's multimedia device. The virtual IT infrastructure user's privileges are then verified by mapping the virtual IT infrastructure user to a defined one of roles. The relevant data is then obtained using utility applications based on the outcome of verified virtual IT infrastructure user's privileges. A three-dimensional (3D) feed is then generated by compiling the obtained relevant data based on associated one or more of resources in the virtual datacenter. The three-dimensional (3D) multimedia feed is then dynamically rendered to the virtual IT infrastructure user's multimedia device.

28 Claims, 6 Drawing Sheets

(56) References Cited

U.S. PATENT DOCUMENTS

| | | |
|---|---|---|
| 2012/0185922 A1 | 7/2012 | Kamity |
| 2012/0221640 A1* | 8/2012 | Cohen ............... H04L 29/08333 |
| | | 709/204 |
| 2015/0237091 A1* | 8/2015 | Liang ..................... H04L 67/10 |
| | | 709/219 |

OTHER PUBLICATIONS

Pieter Jorissen, Fabian Di Fiore, Gert Vansichem, and Wim Lamotte, Hasselt University, Belgium, "A Virtual Interactive Community Platform Supporting Education for Long-Term Sick Children", CDVE 2007, LNCS 4674, pp. 58-69, 2007.*

VMware Access Control 101: Roles and Permissions, https://www.pluralsight.com/blog/tutorials/vmware-access-control-101-roles-and-permissions, by Petra Jorgenson on May 16, 2014.*

* cited by examiner

GENERATING AN AUTOMATED MULTIMEDIA FEED BASED ON VIRTUAL IT INFRASTRUCTURE USERS NEEDS/INTEREST

CROSS-REFERENCE TO RELATED APPLICATION(S)

Benefit is claimed under 35 U.S.C. 119(a)-(d) to Foreign application Serial No. 6429/CHE/2014 filed in India entitled "GENERATING AN AUTOMATED MULTIMEDIA FEED BASED ON VIRTUAL IT INFRASTRUCTURE USERS NEEDS/INTEREST", on Dec. 19, 2014, by VMware, Inc., which is herein incorporated in its entirety by reference for all purposes.

BACKGROUND

Generally, existing information technology (IT) management systems provide a web-based user interface to report information needed to proactively ensure health, risk, efficiency, compliance and other such information. Most existing solutions provide such information via email, short messaging service (SMS), simple network management protocol (SNMP), Web-based alerting and the like. Such systems, typically, pack a large number of features to assist users, drill down to manage such issues in a datacenter. Further, typically, existing systems require the users to be highly proficient in compiling all the pieces of reported information to make any meaningful sense of the reported information. Furthermore, the existing systems may require a significant amount of high level training in order to attain any proficiency in understanding and using such reported information. Moreover, the virtual IT infrastructure may pose additional challenges associated with capacity planning and efficient use of IT resources, since each VM provides a local virtual desktop that runs on a remote physical server. Further, each VM has allocated capacity, for example, disk space, processing resources, memory, application software, operating system (OS) and the like.

SUMMARY

One or more embodiments disclosed herein provide a method for generating an automated multimedia feed based on virtual IT infrastructure user's needs and interests. In one aspect, the method includes requesting to dynamically render multimedia feed associated with the virtual datacenter which is received via a virtual IT infrastructure user's multimedia device. The virtual IT infrastructure user's privileges are then verified by mapping the virtual IT infrastructure user to a defined one of roles. The relevant data is then obtained from the virtual datacenter using utility applications based on the outcome of verified virtual IT infrastructure user's privileges. A three-dimensional (3D) multimedia feed is generated by compiling the obtained relevant data based on associated one or more of resources in the virtual datacenter. The three-dimensional (3D) multimedia feed is then dynamically rendered to the virtual IT infrastructure user's multimedia device.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a virtual machine. The instructions, when executed in a computing device, perform the steps of generating an automated multimedia feed based on virtual IT infrastructure user's needs and interests.

Embodiments of the present disclosure provide a computer system. The computing system includes multiple host computing systems in a failover cluster in a virtual datacenter. The computing system further includes a network that is communicatively coupled to the multiple host computing systems. Moreover, the computing system includes a management server that is communicatively coupled to the network, wherein the management server includes a virtual management software, which further includes a multimedia generation module and each of the multiple host computing systems includes an associated failover agent, wherein the multimedia generation module is configured to automatically generate multimedia feed based on virtual IT infrastructure user's needs and interests

DETAILED DESCRIPTION

Embodiments described herein provide a technique for automatically generating multimedia feed based on virtual IT infrastructure user's needs and interests. The technique provides an on-demand news channel, which generates and reports out problems in virtual IT infrastructure via audio-visual news based on user's interests. Also, the technique provides a three-dimensional (3D) wired map view of the virtual IT infrastructure via audio-visual news. Further the technique is designed to provide smart and intuitive presentation of IT problems that can bring about a big change in the way management software is perceived today. Furthermore, the technique achieves this by one approach of presenting such information via a news channel. Moreover, the news channel is configured to broadcast audiovisual (A/V) information about the datacenter objects to highlight the problem areas that may need user attention.

In addition, the technique is configured to provide three-dimensional (3D) view of datacenter objects, which are dynamically rendered, can draw attention to the object in context. The audio aspect of the information presented via the news channel may be subjective based on the datacenter events and possible threats. Such intelligent, effective and consistent reporting of A/V information can eliminate errors resulting from subjective human interpretations. The A/V information is provided to any average user who may not be proficient with using existing management software. Further, such reporting of A/V information may invite attention of users and may assists users to visualize the extent of a problem or problem area. Furthermore, it can be seen that such A/V information can be secured and rendered based on user's roles. Moreover, such A/V information can highlight datacenter information intuitively to the users. It can be a laidback approach to datacenter monitoring through on-demand news from any device that supports video playback.

The terms "placing" and "provisioning" are used interchangeably throughout the document.

System Overview and Examples of Operation

Figure 1:
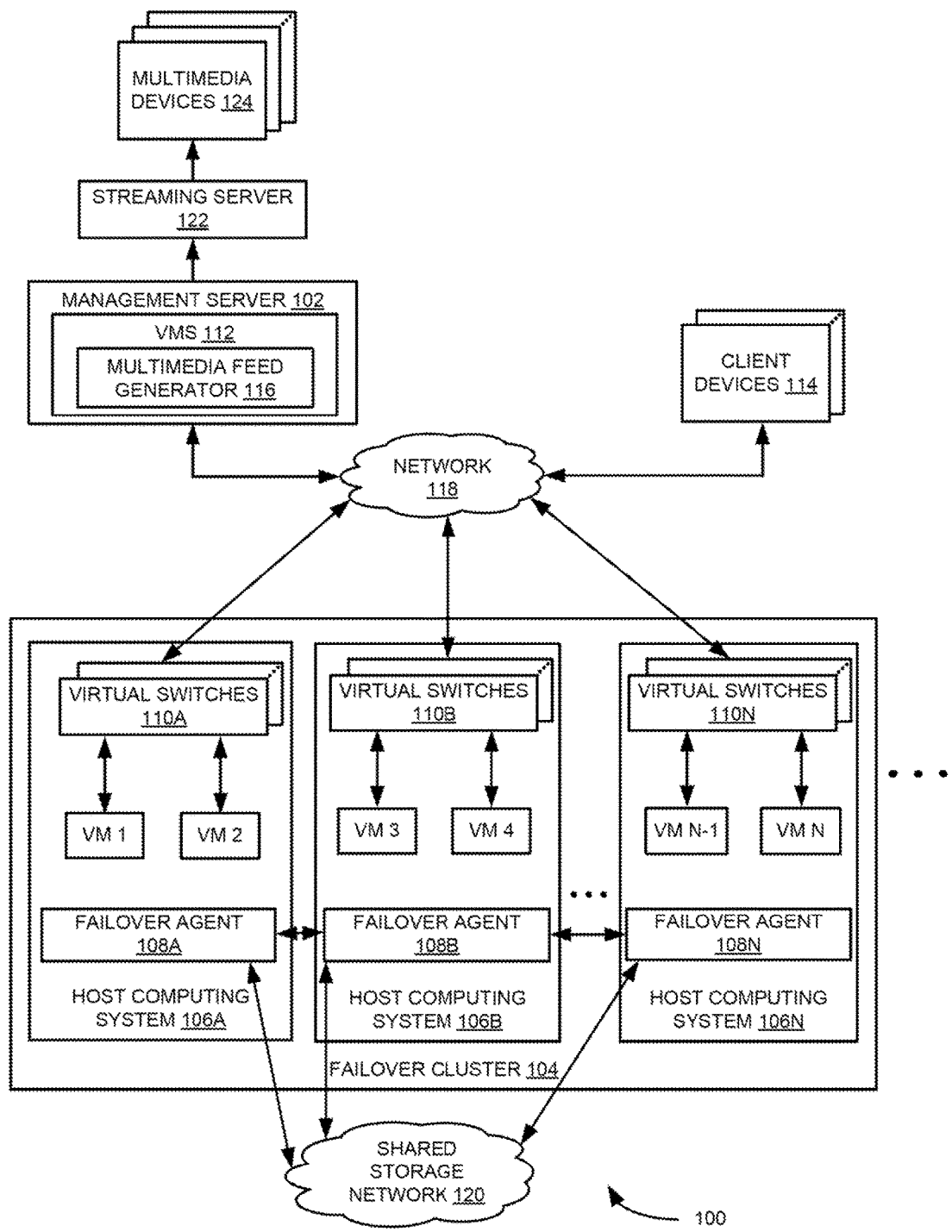
FIG. 1 is a block diagram illustrating system for generating multimedia feed based on virtual IT infrastructure user's needs, according to an example embodiment.

FIG. 1 is a block diagram illustrating system for automatic generation of multimedia feed based on virtual IT infrastructure user's needs in a virtual datacenter 100, according to an example embodiment. As shown in FIG. 1, system 100 includes multiple host computing systems 106A-N and associated virtual machines (VMs) VM1-N hosted by multiple host computing systems 106A-N in a failover cluster 104. Also as shown in FIG. 1, system 100 includes management server 102 that is communicatively coupled to multiple host computing systems 106A-N via network 118 via associated virtual switches 110 A-N. Further as shown in FIG. 1, management server 102 includes virtual management software (VMS) 312, which in turn includes multimedia feed generator 116. Furthermore as shown in FIG. 1, multiple host computing systems 106A-N include associated failover agents 108A-N. In addition, as shown in FIG. 1, network 118 is communicatively coupled to client devices 114. Also as shown in FIG. 1, each of multiple host computing systems 106 A-N is connected to the shared storage network 120. Further as shown in FIG. 1, management server 102 is coupled to a streaming server 122. Furthermore as shown in FIG. 1, the streaming server 122 is communicatively coupled to virtual IT infrastructure user's multimedia devices 124.

Figure 2:
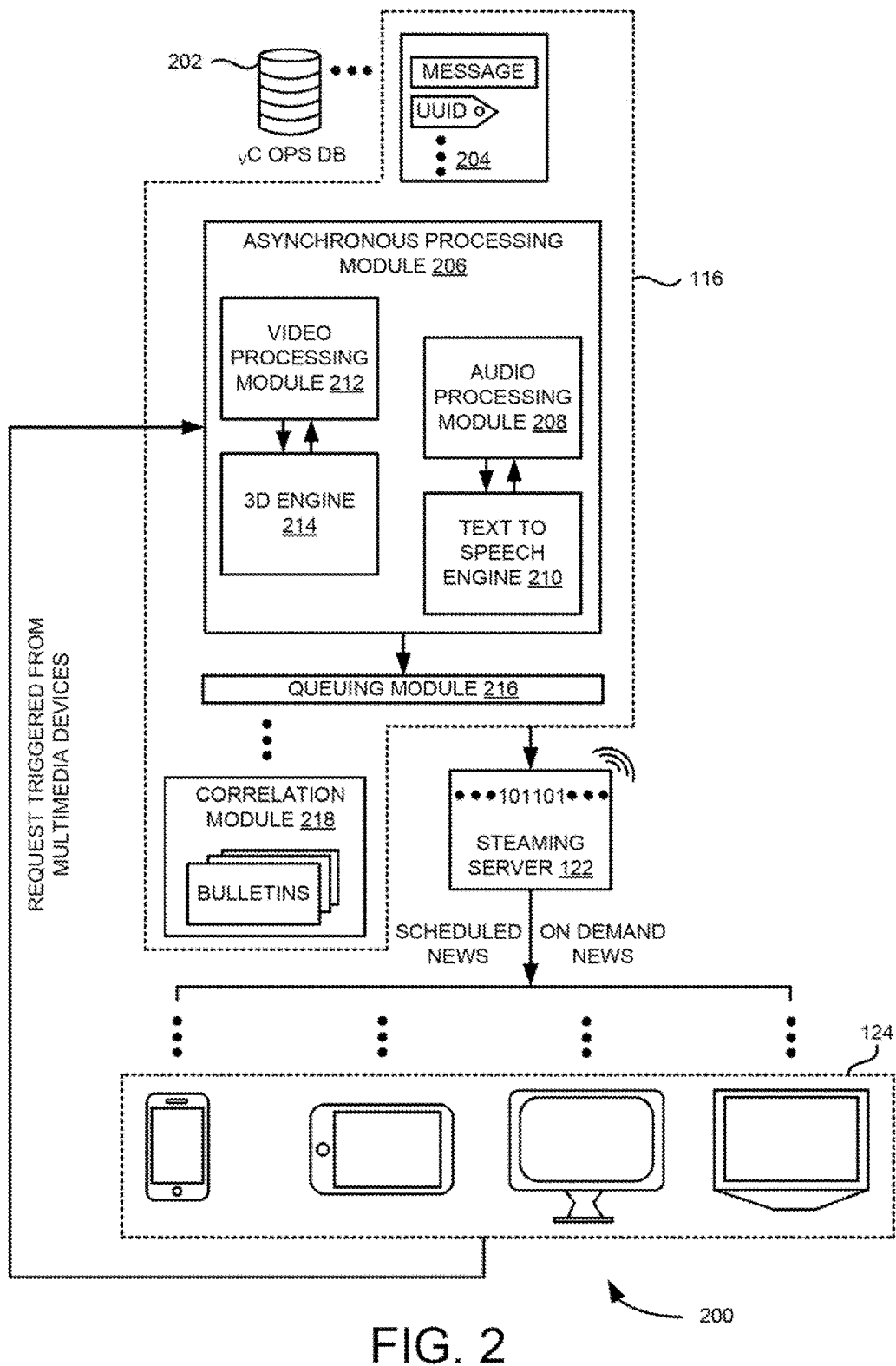
FIG. 2 is a block diagram showing some major components of the multimedia feed generator, such as those shown in FIG. 1, according to an example embodiment.

FIG. 2 is a block diagram 200 showing some major components of the multimedia feed generator 116, such as those shown in FIG. 1, according to an example embodiment. As shown in FIG. 2, multimedia feed generator 116 includes a message tagging module 204, an asynchronous processing module 206, a queuing module 216, and a correlation module 218. Further as shown in FIG. 2, the asynchronous processing module 206 includes an audio processing module 208 that is coupled to a text-to-speech engine 210 and a video processing module 212 that is coupled to a 3D engine 214. In addition as shown in FIG. 2, the multimedia feed generator 116 is coupled to the streaming server 122, which in turn is coupled to the multimedia devices 124. Also as shown in FIG. 2, in some embodiments, a virtual center operations database 202 that is coupled to the multimedia feed generator 116 is the source of feed information to the multimedia feed generator 116.

In operation, multimedia feed generator 116 receives a request to dynamically render multimedia feed associated with the virtual datacenter via a virtual IT infrastructure user's multimedia device 124. Example virtual IT infrastructure user's multimedia devices 124 are mobile computing devices and desktop computing devices. Example mobile computing devices are smartphones, notepads, laptops and the like. Example multimedia feed are audio feed and/or video feed.

Further in operation, multimedia feed generator 116 verifies the IT infrastructure's privileges by mapping the virtual IT infrastructure user to a defined one of roles. Example defined roles are administrator, manager, executive, director and the like. The multimedia feed generator 116 then obtains relevant data from one or more virtual datacenters 100 using utility applications based on the outcome of the verified virtual IT infrastructure user's privileges. Example relevant data are alerts, messages, events, views, relationships with resources, reports and the like. Example, utility applications are based on, remote method invocation (RMI), software development kit (SDK), and/or Web services residing in virtual management software (VMS) 112.

Furthermore in operation, multimedia feed generator 116 compiles the obtained relevant data based on associated one or more of resources in virtual datacenter 100 to form a three-dimensional (3D) multimedia feed. Example resources are host computing systems 106 A-N, virtual machines VM1-N, resource pools, clusters 104, datastores, such as virtual center operations database 202, storage pods and the like.

Also in operation, multimedia feed generator 116 is configured to generate three-dimensional multimedia feed using the compiled relevant data. Multimedia feed generator 116 dynamically renders the 3D multimedia feed to the virtual IT infrastructure user's multimedia device 124. Multimedia feed generator 116 then dynamically renders the generated 3D multimedia feed to the virtual IT infrastructure user's multimedia device 124. In these embodiments, multimedia feed generator 116 dynamically renders the 3D multimedia feed by substantially simultaneously combining both the audio feed and the video feed.

In some embodiments, asynchronous processing module 206 generates the audio feed by converting subjective meaning text in the obtained relevant data. In these embodiments, audio processing module 208 and text-to-speech engine 210 are used to generate the audio feed. Further in some embodiments, multimedia feed generator 116 maintains a database, such as virtual center operations database 202, of descriptive texts for each type of problem that the virtual datacenter is configured to report out. Asynchronous processing module 206 then generates the audio feed by mapping subjective meaningful text in the obtained relevant data to the descriptive texts stored in the virtual center operations database 202.

Further in some embodiments, multimedia feed generator 116 assigns a unique tag id, such as universally unique identification (UUID), for each message in the obtained relevant data as shown in the module 204 in FIG. 2. Asynchronous processing module 206 then parses each message having associated UUID into one or more audio messages and one or more video messages. Audio processing module 208 and video processing module 212 then generates one or more audio feeds and associated one or more video feeds using the associated parsed one or more audio messages and one or more video messages having the same assigned UUID, respectively. In some embodiments video processing module 212 along with the 3D engine 214 is used to generate one or more 3D video feeds. Also in these embodiments, audio processing module 208 along with text-to-speech engine 210 is used to generate one or more associated audio feeds. Queuing module 216 is then used to queue until the associated one or more audio feeds and the one or more video feeds having same UUIDs are received. Correlation module 218 then correlates the one or more audio feeds and the one or more video feeds received from the queuing module 216 to form 3D multimedia stream.

Streaming server 122 then streams the correlated 3D multimedia stream to one or more of virtual IT infrastructure user's multimedia devices 124.

Also, although certain terms are used primarily herein, other terms could be used interchangeably to yield equivalent embodiments and examples. For example, the term "host computing system" may be used interchangeably with "physical host", "physical machine" or "physical device". Further for example, it is well-known that equivalent terms in the field of system visualization or similar or related fields could be substituted for such terms as "physical computer," "hypervisor," "virtual machine," or the like. Further, the terms "virtual computing environment" and "virtual datacenter" are used interchangeably throughout the document. The terms "multimedia" and "audio/video" are used interchangeably throughout the document. The terms "dynamic" and "automatic" are also used interchangeably throughout the document.

Numerous specific details are set forth herein, such as data formats and code sequences and the like, in order to pro vide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 6:
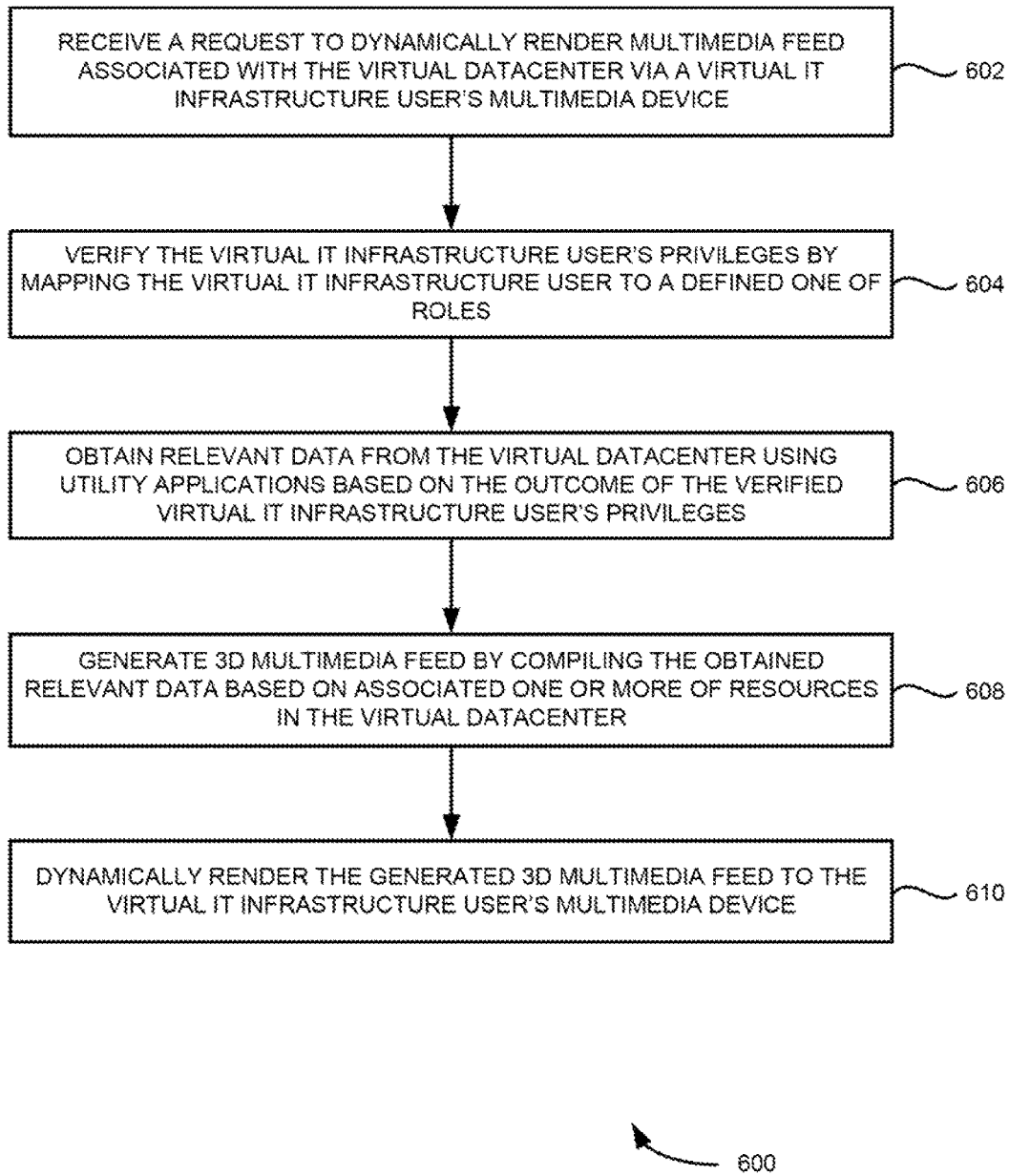
FIG. 6 is a flow diagram of process for generating multimedia feed based on virtual IT infrastructure user's needs, according to an example embodiment.

FIG. 6 is a flow diagram of a process 600, automatic generation of multimedia feed based on virtual IT infrastructure user's needs in a virtual datacenter, according to an example embodiment.

At block 602, process 600 is configured to receive a request to dynamically render multimedia feed associated with the virtual datacenter via a virtual IT infrastructure user's multimedia device. Example multimedia feed includes audio feed and/or video feed. Example multimedia devices are mobile computing devices and/or desktop computing devices. In some embodiments, the process 600 begins with a user triggering for on-demand virtual datacenter news.

At block 604, the virtual IT infrastructure user's privileges are verified by mapping the virtual IT infrastructure user to a defined one of roles. Example roles are administrator, manager or executive.

At block 606, the relevant data from the virtual datacenters using utility applications is obtained based on the outcome of the verified virtual IT infrastructure user's privileges. Example relevant data are alerts, events, relationships and reports. Example utility applications are based on remote method invocation (RMI) and/or software development kit (SDK) or Web services residing in VMS. At block 608, 3D multimedia feed is generated using the obtained relevant data based on associated one or more of resources in the virtual datacenter. In these embodiments, alerts, typically, provides with a list of problems in the virtual datacenter. Also in these embodiments, reports and views provide on-demand information about various virtual datacenter problems. Further in these embodiments, relevant data, i.e., messages, typically, contain information about the resources, their relationships, alerts, events report identifiers and view data. Example resources are virtual machines (VMs), resource pools, clusters, datastores and/or storage pools. In some example embodiments, a multimedia feed generator 116 residing in VMS 112 generates the 3D multimedia feed using the obtained relevant data based on associated one or more of resources in the virtual datacenter.

Figure 3:
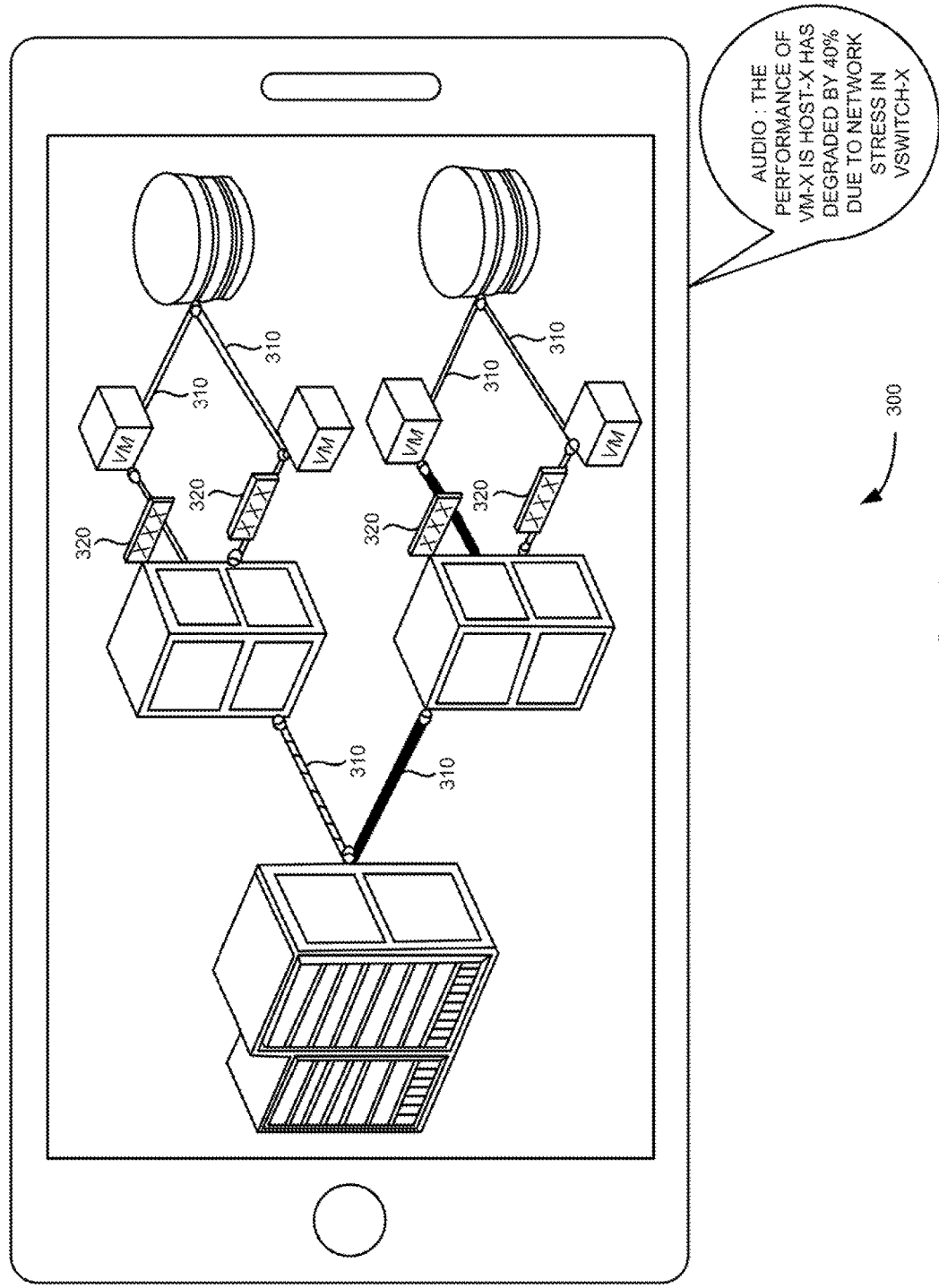
FIG. 3 is an example block diagram illustrating a dynamically rendered multimedia feed based three-dimension (3D) wired map view of a virtual datacenter to the users via a Smartphone to draw attention to an object of context.
Figure 4:
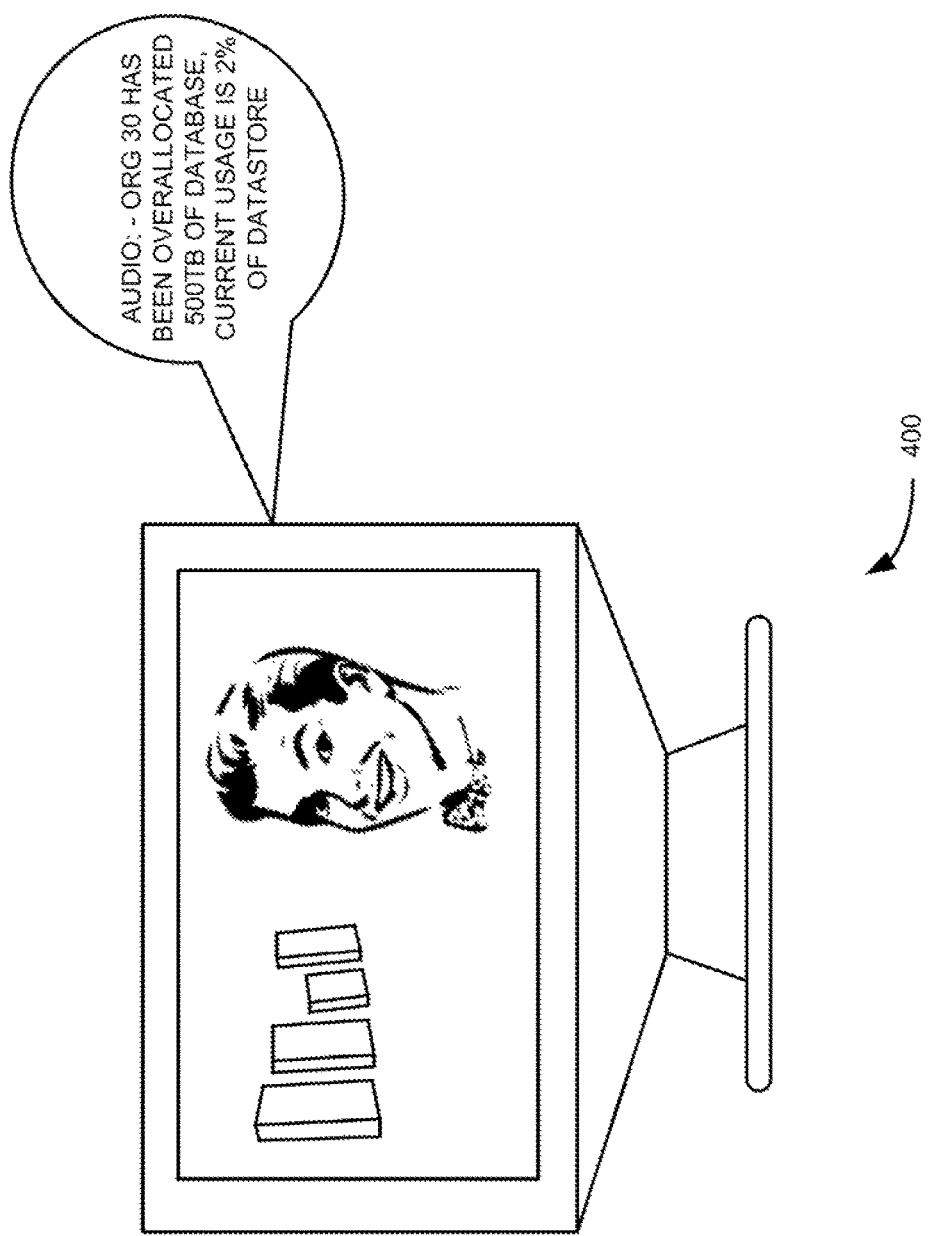
FIG. 4 is another example block diagram illustrating a dynamically rendered multimedia feed to the users via a desktop computing system to draw attention to an over allocated situation in a virtual datacenter.
Figure 5:
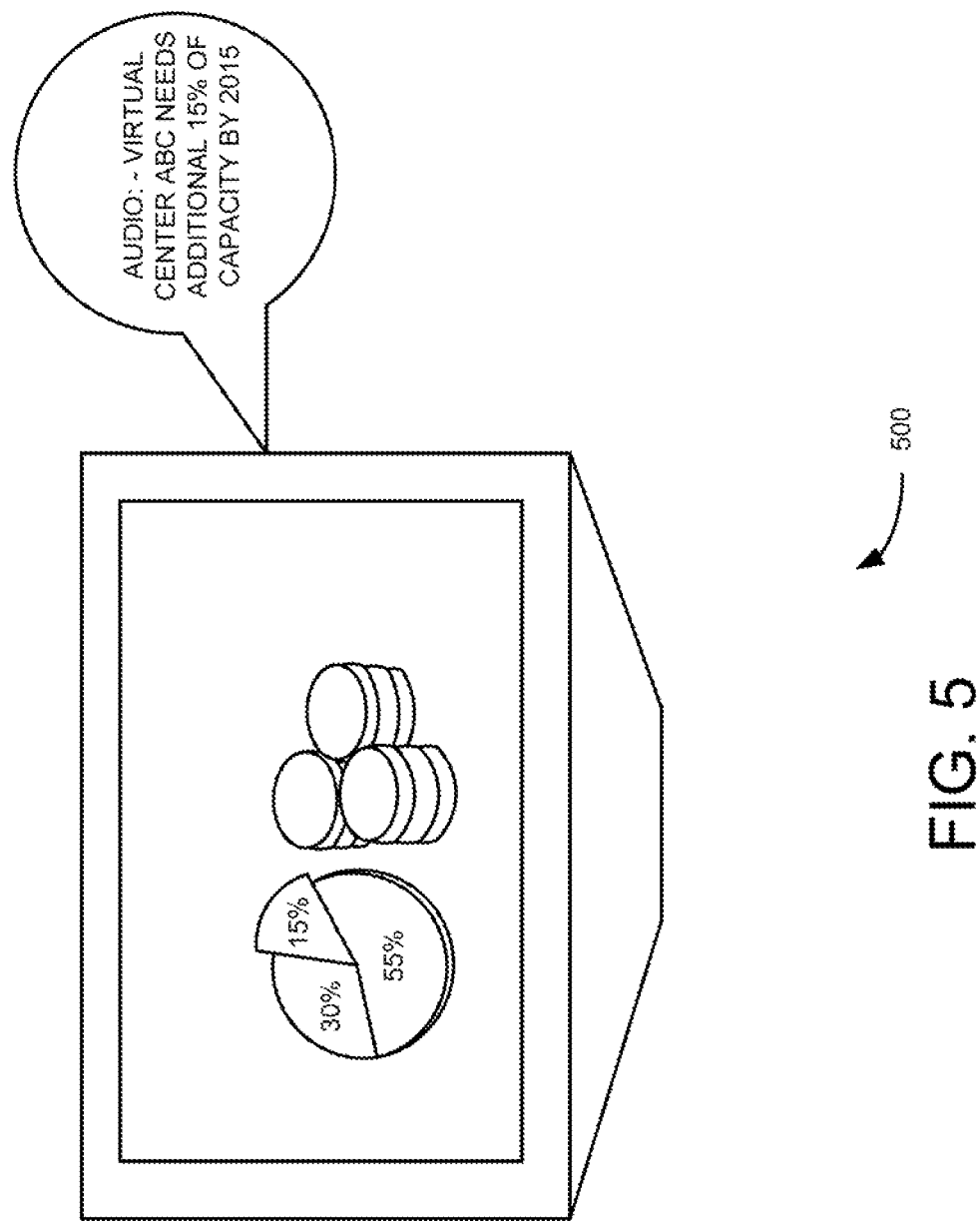
FIG. 5 is yet another example block diagram illustrating a dynamically rendered multimedia feed to the users via a television to draw attention regarding a need for additional capacity in a virtual datacenter.

At block 610, three-dimensional (3D) multimedia feed is dynamically rendered to the virtual IT infrastructure user's multimedia device using the compiled relevant data by a multimedia feed generator. In some embodiments, the 3D multimedia feed is dynamically rendered by substantially simultaneously combining both the audio feed and the video feed. In some embodiments, the compiled relevant data is sent for further processing, where the multimedia feed generator dynamically renders the 3D multimedia feed by using compiled relevant data, i.e., aggregated relevant data by adding animated characters to stimulate multimedia news feed reading. FIG. 3 is a block diagram illustrating an example dynamically rendered multimedia feed based three-dimension (3D) wired map view of a virtual datacenter to the users to draw attention to objects of context 310 and 320. FIGS. 4-5 are block diagrams illustrating other example dynamically rendered multimedia feeds to the users via desktop computing system and television, respectively, to draw attention to the over allocation of storage space and needing additional capacity in the virtual datacenter.

Further in some embodiments, the audio feed is generated by converting subjective meaningful text in the obtained relevant data into speech. Furthermore in some embodiments, a database including descriptive texts for each type of problem that the virtual datacenter is configured to report out is maintained. The audio feed is then generated by mapping subjective meaningful text in the obtained relevant data to the database of descriptive texts.

In some embodiments, dynamically rendering the 3D multimedia feed includes first assigning a unique tag id (i.e., a universally unique identifier (UUID) for each message in the relevant data. In these embodiments, parts of the message are used by the video and audio components separately. Each message having associated UUID is then parsed into one or more audio messages and one or more video messages. One or more audio feeds and associated one or more video feeds are then generated by the multimedia feed generator using the associated parsed one or more audio messages and one or more video messages having same UUIDs. In these embodiments, multimedia feed generator processes the parts independently and renders the video and audio. The generated one or more audio feeds and one or more video feeds having same UUID are then queued. In these embodiments, processed output from each component is then queued until all video and audio feeds are available for dynamic rendering of news feed. The one or more queued audio feeds and the one or more video feeds are then correlated. The 3D multimedia feed is then streamed using the correlated one or more audio feeds and the associated one or more video feeds to one of virtual IT infrastructure user's multimedia devices. Combining the one or more video feeds and the associated one or more audio feeds result in a video file, which are referred to as "bulletins" in FIG. 2' having example formats MPEG-4 (Moving Picture Experts Group-4) or FLV (flash video), which is then dynamically rendered via streaming to the multimedia devices associated with the virtual IT infrastructure users. Bulletins are pieces of news information delivered to the clients via multimedia devices 124 shown in FIG. 2.

In these embodiments, the 3D multimedia feed rendering, for example, 3D rendering of datacenter objects and its alerts is achieved by fetching the resource information from the source database. Further in these embodiments, the multimedia feed generator is configured to obtain all the needed resource information from the source database, even including the resource hierarchy.

Process 600 for automatic generation of multimedia feed based on virtual IT infrastructure user's needs is explained in more detail above with reference to the system diagrams 100-500 shown in FIGS. 1-5.

The architecture shown in FIGS. 1-6 may in some embodiments be partially or fully virtualized. For example, system and method 100 and 600 shown in FIG. 1 and FIG. 6, respectively, may be one or possibly many VMs executing on physical hardware and managed by a hypervisor, VM monitor, or similar technology. Also, multiple host computing systems 106 A-N shown in FIG. 1 may include virtualization logic to manage multiple VMs.

In an example embodiment, components/modules of VMS 112, multimedia feed generator 116 and DRS are implemented using standard programming techniques. In other embodiments, VMS 112 and multimedia feed generator 116 may be implemented as instructions processed by a VM that executes as one of other programs. Even though the above technique is described with reference to multimedia feed generator 116 being residing in VMS 112, which in turn is residing in management server 102, one skilled in the art can envision that multimedia feed generator 116 can be residing in another host computing system and/or a management server that manages and monitors the one or more virtual datacenters. In these embodiments, multimedia feed generator 116 is configured to be a utility application that is not part of VMS 112 and further configured to obtain data from management software, such as VMS 112.

Furthermore, in some embodiments, some or all of the components of VMS 112, multimedia feed generator 116, and DRS may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for optimizing guest OS utilization cost in a processor based licensing model in a virtualized datacenter are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for automatic generation of multimedia feed based on virtual IT infrastructure user's needs in a virtual datacenter, comprising:
    receiving a request to dynamically render multimedia feed associated with the virtual datacenter via a virtual IT infrastructure user's multimedia device;
    verifying the virtual IT infrastructure user's privileges by mapping the virtual IT infrastructure user to a defined one of roles;
    obtaining relevant data from the virtual datacenter using utility applications based on the outcome of the verified virtual IT infrastructure user's privileges;
    generating three-dimensional (3D) multimedia feed associated with the virtual datacenter by compiling the obtained relevant data based on associated one or more of resources in the virtual datacenter, wherein the one or more of resources are host computing systems, virtual machines (VMs), resource pools, clusters, datastores, and/or storage pods; and
    dynamically rendering the generated three-dimensional (3D) multimedia feed to the virtual IT infrastructure user's multimedia device, wherein dynamically rendering the generated 3D multimedia feed comprises:
        assigning a unique tag id (UUID) for each message in the relevant data;
        parsing each message having associated UUID into one or more audio messages and one or more video messages;
        generating one or more audio feeds and associated one or more video feeds using the associated parsed one or more audio messages and one or more video messages having same UUIDs; and
        queuing until all the associated one or more audio feeds and the one or more video feeds having same UUIDs are received.

2. The method of claim 1, wherein the relevant data is selected from the group consisting of alerts, messages, events, views, relationships and reports.

3. The method of claim 1, wherein the defined roles are selected from the group consisting of administrator, manager or executive.

4. The method of claim 1, wherein the multimedia feed includes audio feed and/or video feed.

5. The method of claim 4, wherein dynamically rendering the generated 3D multimedia feed comprises:
    dynamically rendering the 3D multimedia feed by substantially simultaneously combining both audio feed and video feed.

6. The method of claim 5, wherein the audio feed is generated by converting subjective meaningful text in the obtained relevant data into speech.

7. The method of claim 5, wherein generating the audio feed for the 3D multimedia feed comprises:
    maintaining a database of descriptive texts for each type of problem that the virtual datacenter is configured to report out; and generating the audio feed by mapping subjective meaningful text in the obtained relevant data to the descriptive texts in the database.

8. The method of claim 5, wherein dynamically rendering the generated 3D multimedia feed comprises:
correlating the queued one or more audio feeds and the associated one or more video feeds to form 3D multimedia feed; and
streaming the formed 3D multimedia feed to one of virtual IT infrastructure user's multimedia devices.

9. The method of claim 8, wherein the multimedia devices are selected from the group consisting of mobile computing devices and desktop computing devices.

10. The method of claim 1, wherein the utility applications are based on remote method invocation (RMI) and/or software development kit (SDK) or Web services residing in virtual management software (VMS).

11. A non-transitory computer-readable storage medium including instructions that are configured, when executed by a computing system, to perform a method for generating multimedia feed based on virtual IT infrastructure user's needs in a virtual datacenter, the method comprising:
receiving a request to dynamically render multimedia feed associated with the virtual datacenter via a virtual IT infrastructure user's multimedia device;
verifying the virtual IT infrastructure user's privileges by mapping the virtual IT infrastructure user to a defined one of roles;
obtaining relevant data from the virtual datacenter using utility applications based on the outcome of the verified virtual IT infrastructure user's privileges;
generating 3D multimedia feed associated with the virtual datacenter by compiling the obtained relevant data based on associated one or more of resources in the virtual datacenter, wherein the one or more of resources are host computing systems, virtual machines (VMs), resource pools, clusters, datastores, and/or storage pods; and
dynamically rendering the three-dimensional (3D) multimedia feed to the virtual IT infrastructure user's multimedia device, wherein dynamically rendering the generated 3D multimedia feed comprises:
assigning a unique tag id (UUID) for each message in the relevant data;
parsing each message having associated UUID into one or more audio messages and one or more video messages;
generating one or more audio feeds and associated one or more video feeds using the associated parsed one or more audio messages and one or more video messages having same UUIDs; and
queuing until all the associated one or more audio feeds and the one or more video feeds having same UUIDs are received.

12. The non-transitory computer-readable storage medium of claim 11, wherein the relevant data is selected from the group consisting of alerts, messages, events, views, relationships and reports.

13. The non-transitory computer-readable storage medium of claim 11, wherein the defined roles are selected from the group consisting of administrator, manager or executive.

14. The non-transitory computer-readable storage medium of claim 11, wherein the multimedia feed includes audio feed and/or video feed.

15. The non-transitory computer-readable storage medium of claim 14, wherein dynamically rendering the 3D multimedia feed comprises:
dynamically rendering the 3D multimedia feed by substantially simultaneously combining both audio feed and video feed.

16. The non-transitory computer-readable storage medium of claim 15, wherein the audio feed is generated by converting subjective meaningful text in the obtained relevant data into speech.

17. The non-transitory computer-readable storage medium of claim 15, wherein generating the audio feed for the 3D multimedia feed comprises:
maintaining a database of descriptive texts for each type of problem that the virtual datacenter is configured to report out; and
generating the audio feed by mapping subjective meaningful text in the obtained relevant data to the database of descriptive texts.

18. The non-transitory computer-readable storage medium of claim 15, wherein dynamically rendering the 3D multimedia feed comprises:
correlating the queued one or more audio feeds and the associated one or more video feeds to form 3D multimedia feed; and
streaming the formed 3D multimedia feed to one of virtual IT infrastructure user's multimedia devices.

19. A computing system for generating multimedia feed based on virtual IT infrastructure user's needs in a virtual datacenter, the system comprising:
multiple host computing systems, wherein each host computing system hosting multiple VMs;
a streaming server;
one or more virtual IT infrastructure user's multimedia devices coupled to the streaming server; and
a management server communicatively coupled to the multiple host computing systems and the streaming server, wherein the management server comprising virtual management software (VMS), and wherein the VMS includes a multimedia feed generator, and they are configured to:
verify the virtual IT infrastructure user's privileges by mapping the virtual IT infrastructure user to a defined one of roles upon receiving a request to dynamically render multimedia feed associated with the virtual datacenter via a virtual IT infrastructure user's multimedia device;
obtain relevant data from the virtual datacenter using utility applications based on the outcome of the verified virtual IT infrastructure user's privilege;
generate 3D multimedia feed associated with the virtual datacenter by compiling the obtained relevant data based on associated one or more of resources in the virtual datacenter, wherein the one or more of resources are host computing systems, virtual machines (VMs), resource pools, clusters, datastores, and/or storage pods; and
dynamically render the generated three-dimensional (3D) multimedia feed to the virtual IT infrastructure user's multimedia device using the compiled relevant data, wherein the multimedia feed generator assigns a unique tag id (UUID) for each message in the relevant data, parses each message having associated UUID into one or more audio messages and one or more video messages, generates one or more audio feeds and associated one or more video feeds using the associated parsed one or more audio messages and one or more video messages having same UUIDs by the multimedia feed generator, and queues until all the associated one or more audio feeds and the one or more video feeds having same UUIDs are received.

20. The computing system of claim 19, wherein the relevant data is selected from the group consisting of alerts, messages, events, views, relationships and reports.

21. The computing system of claim 19, wherein the defined roles are selected from the group consisting of administrator, manager or executive.

22. The computing system of claim 19, wherein the multimedia feed includes audio feed and/or video feed.

23. The computing system of claim 22, wherein the multimedia feed generator is configured to dynamically render the 3D multimedia feed by substantially simultaneously combining both audio and video feed.

24. The computing system of claim 23, wherein the multimedia feed generator generates the audio feed by converting subjective meaningful text in the obtained relevant data into speech.

25. The computing system of claim 23, wherein the multimedia feed generator maintains a database of descriptive texts for each type of problem that the virtual datacenter is configured to report out, and wherein the multimedia feed generator generates the audio feed by mapping subjective meaningful text in the obtained relevant data to the database of descriptive texts.

26. The computing system of claim 23, wherein the multimedia feed generator correlates the queued one or more audio feeds and the associated one or more video feeds, and streams the 3D multimedia feed using the correlated one or more audio feeds and the associated one or more video feeds to one of virtual IT infrastructure user's multimedia devices.

27. The computing system of claim 26, wherein the multimedia devices are selected from the group consisting of mobile computing devices and desktop computing devices.

28. The computing systems of claim 19, wherein the utility applications are based on remote method invocation (RMI) and/or software development kit (SDK) or Web services residing in virtual management software (VMS).

* * * * *